(12) United States Patent
Smith et al.

(10) Patent No.: US 8,265,800 B2
(45) Date of Patent: Sep. 11, 2012

(54) UNMANNED VEHICLE MESSAGE CONVERSION SYSTEM

(75) Inventors: Timothy D. Smith, Annandale, VA (US);
Christopher J. Hecht, Fairfax, VA (US);
Jorgen D. Pedersen, Gibsonia, PA (US);
Timothy J. Davison, Pittsburgh, PA (US)

(73) Assignee: Raytheon Company, Waltham, MA (US)

( * ) Notice: Subject to any disclaimer, the term of this patent is extended or adjusted under 35 U.S.C. 154(b) by 1422 days.

(21) Appl. No.: 11/841,447

(22) Filed: Aug. 20, 2007

(65) Prior Publication Data
US 2009/0216390 A1 Aug. 27, 2009

(51) Int. Cl.
*G05D 1/00* (2006.01)
*G05D 3/00* (2006.01)
*G06F 7/00* (2006.01)
*G06F 17/00* (2006.01)

(52) U.S. Cl. ............ 701/2; 709/230; 709/231; 709/232; 709/246; 709/249; 244/75.1; 244/190; 370/466; 370/467

(58) Field of Classification Search ...... 701/2; 709/230, 709/231, 232, 246, 249; 244/75.1, 190; 370/466, 370/467, 469
See application file for complete search history.

(56) References Cited

U.S. PATENT DOCUMENTS

| 4,939,651 | A * | 7/1990 | Onishi | 701/26 |
|---|---|---|---|---|
| 6,134,481 | A * | 10/2000 | Warren | 700/28 |
| 6,654,355 | B1 * | 11/2003 | Marbach et al. | 370/285 |
| 6,694,228 | B2 * | 2/2004 | Rios | 701/2 |
| 6,873,886 | B1 * | 3/2005 | Mullen et al. | 701/2 |
| 7,388,879 | B2 * | 6/2008 | Sabe et al. | 370/466 |
| 7,599,305 | B2 * | 10/2009 | Bui | 370/252 |
| 2005/0234592 | A1 * | 10/2005 | McGee et al. | 700/245 |
| 2005/0254518 | A1 | 11/2005 | Fujimori | |
| 2006/0271248 | A1 * | 11/2006 | Cosgrove et al. | 701/2 |
| 2007/0235584 | A1 | 10/2007 | Corman et al. | |
| 2008/0133052 | A1 * | 6/2008 | Jones et al. | 700/245 |
| 2009/0012657 | A1 * | 1/2009 | Knotts et al. | 701/3 |
| 2009/0112388 | A1 * | 4/2009 | Yeager et al. | 701/23 |
| 2009/0265036 | A1 * | 10/2009 | Jamieson et al. | 700/259 |

OTHER PUBLICATIONS

Cummings et al., STANAG 4586 Human Supervisory Control Implications, 2006, MIT.edu, pp. 1-7.*
Jorgen Pedersen, A Practical View and Future Look at JAUS, May 2006, RE2 Inc,. pp. 1-9.*
PCT; Notification of Transmittal of the International Search Report and the Written Opinion of the ISA for PCT/US2008/073621 (15 pages), Aug. 18, 2009.
Cummings, M. L.; Platts, J.T.; Sulmistras, A.; *Human Performance Considerations in the Development of Interoperability Standards for UAV Interfaces*; (8 pages), 2006.

* cited by examiner

*Primary Examiner* — Khoi Tran
*Assistant Examiner* — Jamie Figueroa
(74) *Attorney, Agent, or Firm* — Schwegman Lundberg & Woessner, P.A.

(57) ABSTRACT

According to one embodiment of the disclosure, an unmanned vehicle message conversion system generally includes a message interpreter that is coupled between a first unmanned vehicle control interface and a second unmanned vehicle control interface. The second unmanned vehicle control interface is configured to transmit and receive messages with a messaging protocol that is different than the first unmanned vehicle control interface. The message interpreter is operable to receive a first message from the unmanned vehicle control system, convert the first message to a second message having the second protocol, and transmit the second message to the unmanned vehicle.

18 Claims, 2 Drawing Sheets

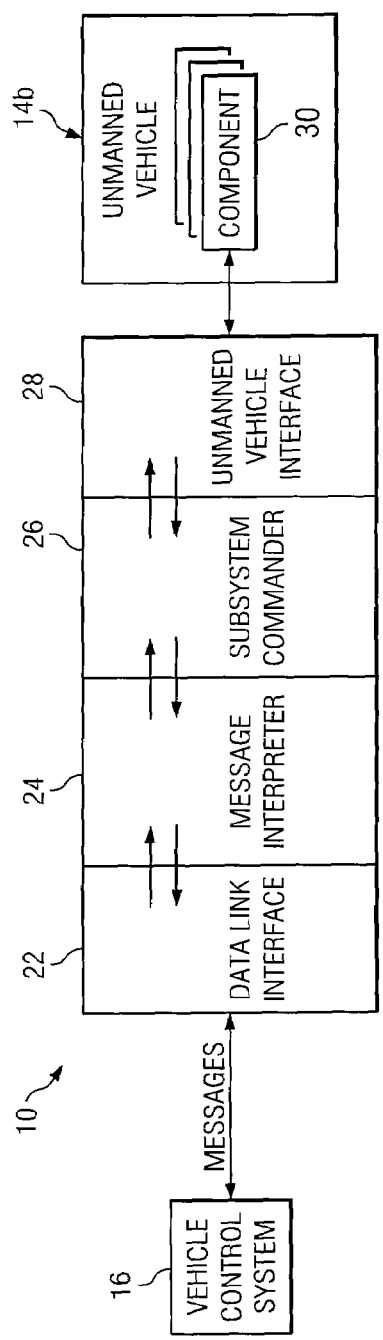
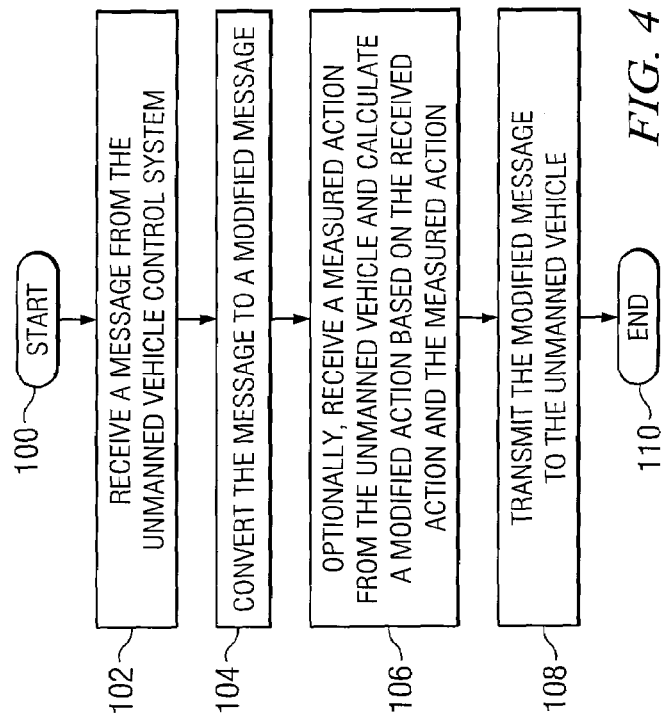

UNMANNED VEHICLE MESSAGE CONVERSION SYSTEM

GOVERNMENT RIGHTS

This invention was made with Government support under the Navy Interoperability Program. The Government may have certain rights in this invention.

TECHNICAL FIELD OF THE DISCLOSURE

This disclosure relates generally to unmanned vehicles, and more particularly, to an unmanned vehicle message conversion system and a method for using the same.

BACKGROUND OF THE DISCLOSURE

Various types of unmanned vehicles, such as unmanned surface vehicles (USVs) and unmanned aerial vehicles (UAVs), have been developed to enable transport of various payloads without an onboard crew. These unmanned vehicles may be used to accomplish tasks that may be generally too dangerous or impractical for direct human involvement. For example, unmanned vehicles may be used in military missions for reconnaissance of enemy forces over enemy lines to avoid deployment of military personnel in harm's way. Unmanned vehicles may also be used in harsh environments, such as chemically contaminated areas or at high altitudes that may be generally unsuitable for human habitation.

SUMMARY OF THE DISCLOSURE

According to one embodiment of the disclosure, an unmanned vehicle message conversion system generally includes a message interpreter that is coupled between a first unmanned vehicle control interface and a second unmanned vehicle control interface. The second unmanned vehicle control interface is configured to transmit and receive messages using a messaging protocol that is different than the first unmanned vehicle control interface. The message interpreter is operable to receive a first message from an unmanned vehicle control system coupled to the first unmanned vehicle control interface, convert the first message to a second message having the second protocol, and transmit the second message to the unmanned vehicle.

Some embodiments of the invention may provide numerous technical advantages. Some embodiments may benefit from some, none, or all of these advantages. For example, one embodiment of the unmanned vehicle message conversion system may enable control of unmanned vehicles that communicate using a protocol having relatively poor reflexive characteristics, such as the joint architecture for unmanned systems protocol. The unmanned vehicle message conversion system may incorporate a reflex driver that modifies messages sent to the unmanned vehicle based upon one or more sensors that measure actual environmental conditions around the unmanned vehicle. Thus, unmanned vehicles having a joint architecture for unmanned systems compliant interface may be controlled using other unmanned vehicle control systems may not have relatively good reflexive characteristics, such as the standardization agreement 4586 protocol.

Other technical advantages may be readily ascertained by one of ordinary skill in the art.

BRIEF DESCRIPTION OF THE DRAWINGS

A more complete understanding of embodiments of the disclosure will be apparent from the detailed description taken in conjunction with the accompanying drawings in which:

FIG. 2 is a block diagram showing several elements of the unmanned vehicle conversion system of FIG. 1;

FIG. 4 is a flowchart showing one embodiment of a series of actions that may be performed by the unmanned vehicle conversion system of FIG. 1.

DETAILED DESCRIPTION OF EXAMPLE EMBODIMENTS

The STANdardization AGreement (STANAG) 4586 protocol is one of several messaging protocols that has been implemented for use with unmanned vehicles. The standardization agreement 4586 specification, which defines its associated messaging protocol, has been written by member nations of the North Atlantic Treaty Organization (NATO) for the purpose of encouraging interoperability of unmanned vehicles among each member nation. Thus, unmanned vehicles having a standardization agreement 4586 compliant interface may be coordinated with those of other member nations using a common control system.

The Joint Architecture for Unmanned Systems (JAUS) is another messaging protocol that has been implemented for use with unmanned vehicles by the United States Department of Defense. The joint architecture for unmanned systems specification provides a generally hierarchal system of subsystems, nodes, and components that define various aspects of an unmanned vehicle network. Each subsystem may be an unmanned vehicle, a control system, or an intermediary subsystem for conveying messages between the unmanned vehicle and its respective control system. A node may be any portion of the unmanned vehicle that is configured to accomplish a particular task and may include one or more components that function together in order to accomplish that task. Numerous types of unmanned vehicles having a joint architecture for unmanned systems compliant interface have been developed. Because the joint architecture for unmanned systems messaging protocol is different from the standardization agreement 4586 messaging protocol, unmanned vehicles configured with a joint architecture for unmanned systems compliant interface are generally inoperable with control systems having a standardization agreement 4586 interface.

Figure 1:
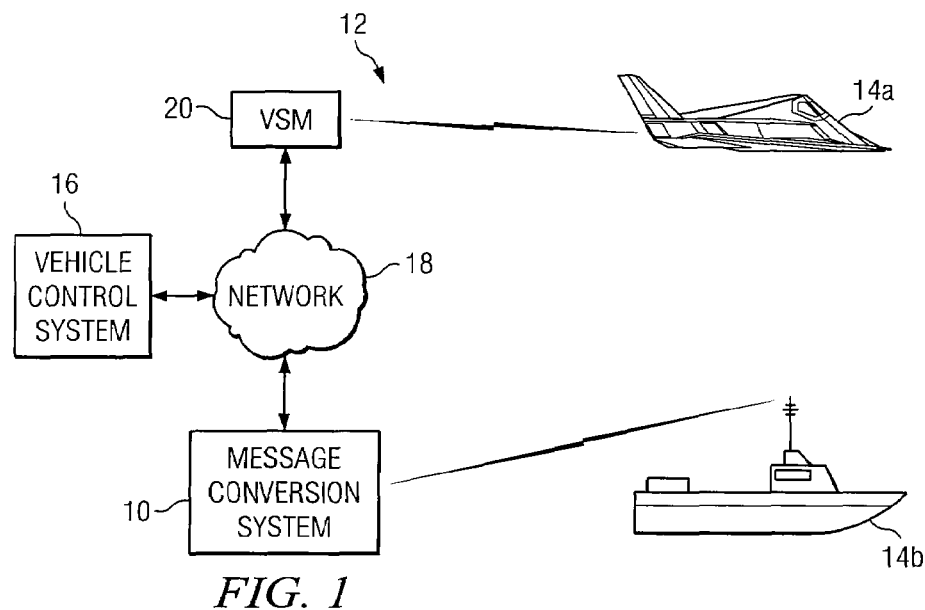
FIG. 1 is a diagram showing one embodiment of a unmanned vehicle conversion system that may be incorporated into an unmanned vehicle network.

FIG. 1 shows one embodiment of a unmanned vehicle message conversion system 10 configured in an unmanned vehicle network 12 that may provide a solution to this problem as well as other problems. Unmanned vehicle network 12 may include a vehicle control system 16 for controlling movement, information interchange, and other various operations of one or more unmanned vehicles 14. Vehicle control system 16 may communicate with unmanned vehicle 14a using a first messaging protocol that in one embodiment, may be a standardization agreement 4586 protocol. According to the teachings of the present disclosure, the unmanned vehicle message conversion system 10 may also allow communication with unmanned vehicle 14b that communicates using a messaging protocol different from the native messaging protocol of the vehicle control system 16. In the particular embodiment shown, unmanned vehicle 14a is an aircraft and unmanned vehicle 14b is a boat; however, unmanned vehicles 14a and 14b may be any suitable type of vehicle that is capable of unmanned operation and controllable by vehicle control system 16.

In one embodiment, unmanned vehicle 14b may communicate using a joint architecture for unmanned systems messaging protocol. Certain embodiments of the unmanned vehicle message conversion system 10 may provide an advantage in that control of differing types of unmanned vehicles 14 may be provided through a single vehicle control system 16. In this manner, the operation of a number of differing types of unmanned vehicles 14 may be coordinated together for accomplishing a common goal, such as reconnaissance support over a battlefield or other relatively large scale tasks.

Vehicle control system 16 is configured to administer operation of unmanned vehicles 14a and 14b by a user. The vehicle control system 16 may receive input from the user and convert this input into various messages for communication with each of the unmanned vehicles 14a and 14b. These messages may include commands for performing a particular maneuver or requests for information from the unmanned vehicles 14a and 14b. In one embodiment, the vehicle control system 16 may transmit and receive messages using a standardization agreement 4586 messaging protocol. Vehicle control system 16 using a standardization agreement 4586 messaging protocol may communicate with the unmanned vehicles 14a and 14b through a network 18, such as a UDP/IP network. Each type of unmanned vehicle 14 may communicate with the vehicle control system 16 using a vehicle specific module 20. According to the teachings of the present disclosure, unmanned vehicle message conversion system 10 may be operable to enable control of the one or more unmanned vehicles 14b by the vehicle control system 16 having a messaging protocol that differs from the messaging protocol of the unmanned vehicles 14b.

FIG. 2 is a block diagram showing one embodiment of the unmanned vehicle message conversion system 10. The unmanned vehicle message conversion system 10 may be executed on any suitable computing system using executable instructions stored in a memory. The unmanned vehicle message conversion system 10 may include several components, such as a data link interface (DLI) 22, a message interpreter 24, a subsystem commander 26, and an unmanned vehicle interface 28. The data link interface 22 is operable to transmit and receive standardization agreement 4586 compliant messages to and from the vehicle control system 16 through the network 18. The message interpreter 24 is operable to convert messages from the vehicle control system 16 through the data link interface 22 to a messaging protocol suitable for use by unmanned vehicle 14b. The subsystem commander 26 may operate in a manner similar to an operator control unit (OCU) as specified in the joint architecture for unmanned systems specification. That is, the joint architecture for unmanned systems subsystem commander 26 may provide centralized control for various unmanned vehicles 14b that communicate with the unmanned vehicle message conversion system 10.

The unmanned vehicle interface 28 may be provided to administer communication between the subsystem commander 26 and each unmanned vehicle 14b. Each unmanned vehicle 14b may have several components 30 that provide various functions, such as, for example, servo movement for control of the unmanned vehicle or sensor devices for gathering information. The unmanned vehicle interface 28 may be operable to delegate messages to each component 30 configured on the unmanned vehicle 14b.

Figure 3:
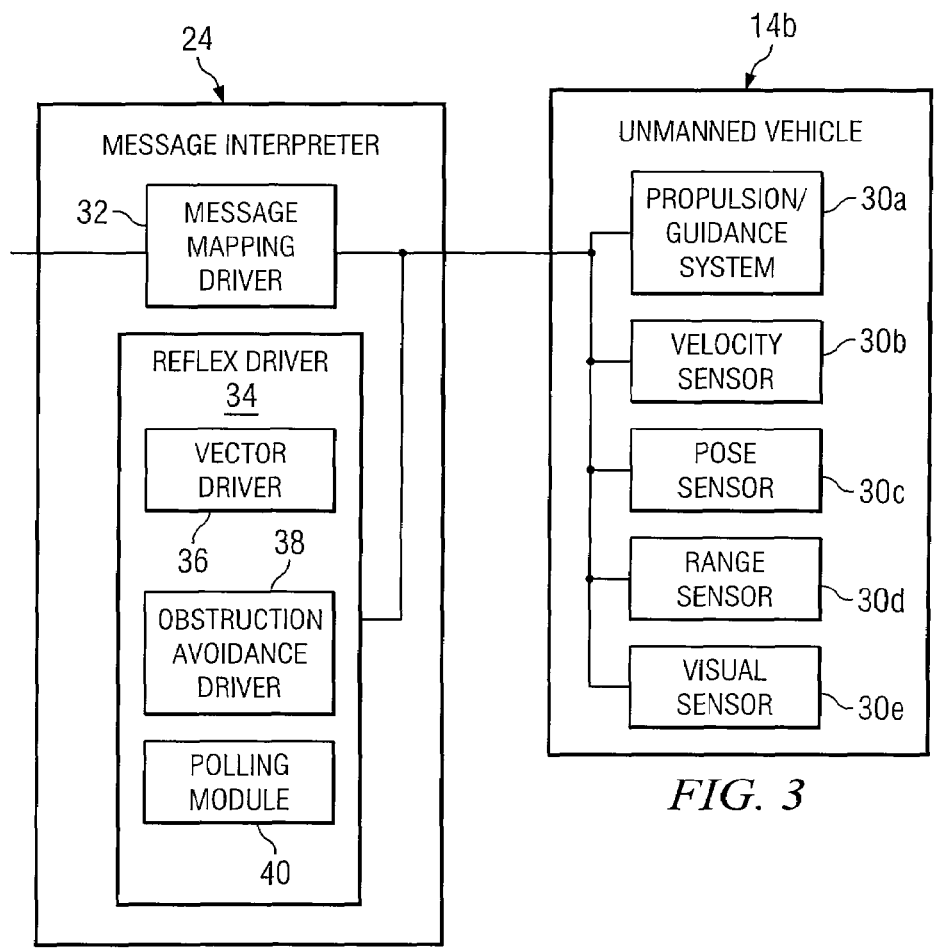
FIG. 3 is a block diagram showing several elements of the message interpreter element of the unmanned vehicle conversion system of FIG. 1.

FIG. 3 is a block diagram showing several elements of message interpreter 24 that may be used to communicate with various components 30 configured on unmanned vehicle 14b. The message interpreter 24 may include a message mapping driver 32 and a reflex driver 34 that will be described in greater detail below. The message mapping driver 32 may be operable to convert standardization agreement 4586 compliant messages transmitted from the unmanned vehicle control system 16 into joint architecture for unmanned systems compliant messages for use by the various components 30 configured in the unmanned vehicle 14b. The message mapping driver 32 may also be operable to convert joint architecture for unmanned systems compliant messages transmitted from the unmanned vehicle 14b into standardization agreement 4586 compliant messages for use by the unmanned vehicle control system 16. In another embodiment, the message mapping driver 32 may be operable to convert mulitiple standardization agreement 4586 compliant messages from the unmanned vehicle control system 16 to a single joint architecture for unmanned systems message.

The unmanned vehicle 14b may have a number of components 30 that are operable to transmit and receive messages using a joint architecture for unmanned systems protocol. These components may include a propulsion and guidance system 30a and one or more sensors 30b through 30e. The propulsion and guidance system 30a supplies motive force for movement of the unmanned vehicle 14b and may include one or more guidance devices, such as control surfaces or steering mechanisms, that are controlled using joint architecture for unmanned systems compliant messages. Sensors 30b through 30e may be any suitable type of sensor device. In one embodiment, sensors 30b through 30e may be operable to sense various aspects of the unmanned vehicle's environment for controlling the path and velocity of the unmanned vehicle 14b. In another embodiment, sensors may include a velocity sensor 30b, a pose sensor 30c, a range sensor 30d, and a visual sensor 30e. The velocity sensor 30b and pose sensor 30c are configured to measure the velocity and current position respectively, of the unmanned vehicle 14b. The range sensor 30d may be operable to measure the distance from the unmanned vehicle 14b to particular targets, obstructions, or other objects around the unmanned vehicle 14b. The visual sensor 30e is operable to obtain images of the environment around the unmanned vehicle 14b.

The reflex driver 34 may be operable to modify messages transmitted from the message mapping driver 32 to the unmanned vehicle 14b based upon information provided by the one or more sensors 30b through 30e disposed on the unmanned vehicle 14b. That is, messages transmitted from the vehicle control system 16 may be translated by the message mapping driver 32 and modified by reflex driver 34 based upon information provided by the one or more sensors 30b through 30e for control of the unmanned vehicle 14b. The reflex driver 34 may provide reflexive control for any suitable controllable system configured on the joint architecture for unmanned systems compliant unmanned vehicle 14b. The unmanned vehicle 14b may have a number of controllable systems that may include a propulsion and guidance system 30a, such as previously described, a robotic device, such as a robotic arm, one or more surveillance cameras, and the like. The term reflexive control generally refers to the act of automatically manipulating a controllable system in direct response to one or more ambient conditions.

In one embodiment, the reflex driver 34 includes a vector driver 36 that may be operable to provide a modified waypoint and/or modified velocity to the unmanned vehicle 14b in response to varying ambient conditions experienced by the unmanned vehicle 14b. That is, the reflex driver 34 may use information provided by pose sensor 30c, or velocity sensor 30b to provide course correction to the unmanned vehicle 14b. A waypoint may be referred to as a desired destination of the unmanned vehicle 14b and may include latitude and longitude coordinates and in some embodiments may include an altitude coordinate.

Certain embodiments incorporating a reflex driver 34 may enable enhanced control of unmanned vehicles 14b from vehicle control systems using a messaging protocol, such as the standardization agreement 4586 protocol, that do not support reflexive logic for control of the unmanned vehicle's operation. For a particular example in which the unmanned vehicle 14b is a boat, the water in which the boat is traveling may be flowing in an oblique direction with reference to the direction of the boat. Known unmanned vehicles 14b using a joint architecture for unmanned systems compatible messaging protocol are designed to proceed in a direction specified by the waypoint without regard to ambient conditions, such as cross-flow ambient water currents. Thus, the boat may err from its intended destination due to these ambient conditions. The vector driver 36 may be operable to provide a modified waypoint to the unmanned vehicle 14b such that the unmanned vehicle 14b remains at a proper course heading in spite of these cross-flow ambient water currents.

In one embodiment, the reflex driver 34 may include an obstruction avoidance driver 38. The obstruction avoidance driver 38 may be operable to automatically adjust for various impediments, such as obstructions or unforeseen hazards, to the unmanned vehicle 14b. As an example in which the unmanned vehicle 14b is a boat, a visual sensor 30e and/or range sensor 30d configured on the boat may recognize the presence of an island in its path of travel. The obstruction avoidance driver 38 may be operable to determine a new path that directs the boat safely around the island while maintaining a course generally in the direction of its desired waypoint.

In another embodiment, a polling module 40 may be included to periodically poll various sensors 30b through 30e configured on the joint architecture for the unmanned vehicle 14b. In one embodiment, the polling module 40 may be operable to periodically poll the pose sensor 30c and velocity sensor 30c for continual updating of the unmanned vehicle's 14c position and velocity. Using this information, the vector driver 36 may be operable to continually update the modified waypoint that is transmitted to the unmanned vehicle 14b during its operation. In another embodiment, the polling module 40 may be operable to periodically transmit a heartbeat message to the unmanned vehicle 14b and transmit a loss of heartbeat message to the unmanned vehicle control system 16 if a response message to the heartbeat message is not received from the unmanned vehicle 14b.

FIG. 4 is a flowchart showing a series of actions that may be taken by the unmanned vehicle message conversion system 10 to convert messages received from a vehicle control system 16 to a joint architecture for unmanned systems compliant unmanned vehicle 14b. In act 100, the process is initiated. The process may be initiated by performing any bootstrapping operations to the unmanned vehicle message conversion system 10, preparing the unmanned vehicle 14b for a particular mission, and launching the unmanned vehicle 14b on its mission.

In act 102, the unmanned vehicle message conversion system 10 may receive a message from the unmanned vehicle control system 16. The message may incorporate any suitable protocol for communicating with unmanned vehicle 14a and/or unmanned vehicle 14b. In one embodiment, the message is a standardization agreement 4586 compliant message. The message may include information for administering control or retrieving information from the unmanned vehicle 14b. In one embodiment, the message may include a desired action for the unmanned vehicle to perform, such as, for example, a waypoint that geospatially describes a desired destination, a desired movement of a robotic device configured on the unmanned vehicle 14b, or actuation of a peripheral device configured on the unmanned vehicle 14b.

In act 104, the unmanned vehicle message conversion system 10 may convert the message into a modified message having a messaging protocol suitable for use by the unmanned vehicle 14b. In one embodiment, the unmanned vehicle message conversion system 10 may combine several standardization agreement 4586 messages into a joint archetecture for unmanned systems message suitable for use by the unmanned vehicle 14b. In another embodiment, the unmanned vehicle message conversion system 10 may convert a single standardization agreement 4586 compliant message into several joint architecture for unmanned systems compliant messages suitable for use by the unmanned vehicle 14b.

In act 106, the unmanned vehicle message conversion system 10 may optionally receive a message that includes a measured action from the unmanned vehicle 14b. The measured action may be a measured value acquired by one or more sensors 30b through 30e configured on the unmanned vehicle 14b. These measured actions may be used to monitor actual actions taken by one or more controllable systems in response to desired actions received from the unmanned vehicle control system 16. The unmanned vehicle message conversion system 10 may then calculate a modified action based upon the desired action and measured action and transmit this modified action to the unmanned vehicle 14b. In one embodiment in which the action is a waypoint or desired destination of the unmanned vehicle 14b, the modified action may include one or more alternate waypoints received from the unmanned vehicle control system 16 and temporarily stored in the unmanned vehicle message conversion system 10 for the duration of the mission.

Certain embodiments that calculate a modified action in response to a received measured action from the unmanned vehicle 14b may provide an advantage in that reflexive control may be provided for the various controllable systems configured on the unmanned vehicle 14b. Reflexive control generally refers to the ability of a system to adapt or change behavior in response to unforeseen impediments or changing ambient conditions. Certain unmanned vehicle control messaging protocols, such as the standardization agreement 4586 protocol, may not provide relatively good reflexive control characteristics. Thus, the unmanned vehicle message conversion system 10 may be operable to utilize the relatively poor reflexive control characteristics of protocols, such as the standardization agreement 4586 protocol, with other unmanned vehicle messaging protocols having relatively strong reflexive control characteristics in certain embodiments.

In act 108, the unmanned vehicle message conversion system 10 may transmit the modified message to the unmanned vehicle 14b. Given this modified message, the unmanned vehicle 14b may take appropriate action as provided in the information portion of the modified message.

The previously described series of actions 102 through 108 may be repeated for each message transmitted from the unmanned vehicle control system 16 to the unmanned vehicle 14b. Once transmission and receipt of messages between the unmanned vehicle control system 16 and unmanned vehicle 14b is no longer needed or desired, the unmanned vehicle message conversion system 10 may be halted at act 110 in which the unmanned vehicle's 14b mission is complete.

An unmanned vehicle message conversion system 10 has been described that may enable control of an unmanned vehicle 14b using a unmanned vehicle control system 16 with a messaging protocol that is different from a messaging protocol used by the unmanned vehicle 14*b*. The unmanned vehicle message conversion system 10 may be further operable to implement reflexive logic for various controllable systems configured on the unmanned vehicle 14*b* in which its native messaging protocol may not support relatively good reflexive logic characteristics. Using the unmanned vehicle message conversion system 10, existing unmanned vehicles 14*b* may be coordinated with other unmanned vehicles 14*b* incorporating a different messaging protocol through a common unmanned vehicle control system 16.

Although the present invention has been described with several embodiments, a myriad of changes, variations, alterations, transformations, and modifications may be suggested to one skilled in the art, and it is intended that the present invention encompass such changes, variations, alterations, transformation, and modifications as they fall within the scope of the appended claims.

What is claimed is:

1. An unmanned vehicle message conversion system comprising:
   a first unmanned vehicle control interface that is configured to transmit messages, the messages having a standardization agreement 4586 messaging protocol;
   a second unmanned vehicle control interface that is configured to receive messages, the messages having a joint architecture for unmanned ground system messaging protocol;
   a message interpreter, wherein the message interpreter includes a reflex driver and a message mapping driver, wherein the reflex driver is operable to modify messages to be transmitted from the message mapping driver to the second unmanned vehicle control interface based on a sensor measurement, and wherein the message interpreter is coupled between the first unmanned vehicle control interface and the second unmanned vehicle control interface, and the message interpreter is operable to:
      receive at least one first message including a desired action from the first unmanned vehicle control interface;
      convert the at least one first message to at least one second message, the at least one second message having the joint architecture for unmanned ground system messaging protocol;
      modify the second message, using the reflex driver, to a modified message; and
      transmit the modified message to the second unmanned vehicle control interface.

2. An unmanned vehicle message conversion system comprising:
   a first unmanned vehicle control interface that is configured to receive messages, the messages having a first messaging protocol;
   a second unmanned vehicle control interface that is configured to transmit messages, the messages having a second messaging protocol that is different than the first messaging protocol;
   a message interpreter, wherein the message interpreter includes a reflex driver and a message mapping driver, wherein the reflex driver is operable to modify messages to be transmitted from the message mapping driver to the first unmanned vehicle control interface based on a sensor measurement, and wherein the message interpreter is coupled between the first unmanned vehicle control interface and the second unmanned vehicle control interface, and wherein the message interpreter is operable to:
      receive at least one first message from the second unmanned vehicle control interface, wherein the at least one first message includes a desired action;
      convert the at least one first message to at least one second message, the at least one second message having the first messaging protocol;
      modify the second message, with the reflex driver, to create a modified message; and
      transmit the modified message to the first control interface.

3. The unmanned vehicle message conversion system of claim 2, wherein the message interpreter is further operable to receive at least one fourth message from the second unmanned vehicle control interface, convert the at least one fourth message to at least one fifth message having the first messaging protocol, and transmit the at least one fifth message to the first unmanned vehicle control interface.

4. The unmanned vehicle message conversion system of claim 3, wherein the at least one fourth message is a plurality of fourth messages, the message interpreter being further operable to assemble the plurality of fourth messages into a single fifth message.

5. The unmanned vehicle message conversion system of claim 2, wherein the desired action is to travel to a desired waypoint, the sensor measurement is relevant to the desired action, and the modified message indicates to travel to a modified waypoint.

6. The unmanned vehicle message conversion system of claim 5, wherein the desired waypoint and the sensor measurement each include longitude and latitude coordinates.

7. The unmanned vehicle message conversion system of claim 5, wherein the desired waypoint and the sensor measurement each include an altitude coordinate.

8. The unmanned vehicle message conversion system of claim 2, wherein the desired action is a desired velocity, the sensor measurement is a measured velocity, and the modified message indicates a modified velocity.

9. The unmanned vehicle message conversion system of claim 2, wherein the first messaging protocol is a standardization agreement (STANAG) 4586messaging protocol.

10. The unmanned vehicle message conversion system of claim 2, wherein the second messaging protocol is a joint architecture for unmanned ground system (JAUS) messaging protocol.

11. An unmanned vehicle message conversion system comprising:
    a first unmanned vehicle control interface that is configured to transmit and receive messages, the messages having a first messaging protocol, wherein the vehicle control interface transmits messages to, and receives messages from, an unmanned vehicle control system;
    a second unmanned vehicle control interface that is configured to receive messages, the messages having a second messaging protocol that is different than the first messaging protocol;
    a message interpreter, wherein the message interpreter includes a component operable to modify messages based on a sensor measurement, and wherein the message interpreter is coupled between the first unmanned vehicle control interface and the second unmanned vehicle control interface, and the message interpreter is operable to:
       receive at least one first message from the first unmanned vehicle control interface;
       convert the at least one first message to at least one second message, the second message having the second messaging protocol;

modify the second message, with the component, to create a modified message;

transmit the modified message to the second unmanned vehicle control interface; and periodically transmit a heartbeat message to the first unmanned vehicle control interface and transmit a loss of heartbeat message to the unmanned vehicle control system if a response message to the heartbeat message is not received from the first unmanned vehicle control interface.

12. A method comprising:

receiving at least one first message having a first protocol from an unmanned vehicle control system;

converting the at least one first message to at least one second message having a second protocol, the second protocol being different from the first protocol;

transmitting the at least one second message to an unmanned vehicle;

receiving a third message including a measured action from the unmanned vehicle;

determining a modified action based upon a desired action included in the first message and the measured action; and including the modified action in the at least one second message.

13. The method of claim 12, further comprising receiving at least one fourth message having the second protocol from an unmanned vehicle, converting the at least one fourth message to at least one fifth message having the first protocol, and transmitting the at least one fifth message to an unmanned vehicle control system.

14. The method of claim 12, wherein receiving a third message including a measured action further comprises receiving a third message including a measured waypoint, and determining a modified action based upon a desired action included in the first message and the measured action further comprises determining a modified waypoint based upon a desired waypoint included in the first message and the measured waypoint.

15. The method of claim 12, wherein receiving a third message including a measured action further comprises receiving a third message including a measured velocity, and determining a modified action based upon a desired action included in the first message and the measured action further comprises determining a modified velocity based upon a desired velocity included in the first message and the measured velocity.

16. The method of claim 12, wherein receiving at least one first message having a first protocol further comprises receiving at least one first message having a standardization agreement 4586 protocol.

17. The method of claim 12, wherein converting the at least one first message to at least one second message having a second protocol further comprises converting the at least one first message to the at least one second message having a joint architecture for unmanned systems protocol.

18. A method comprising:

receiving at least one first message, the first message having a first messaging protocol, from an unmanned vehicle control system;

converting the at least one first message to at least one second message having a second messaging protocol, the second messaging protocol being different from the first messaging protocol;

transmitting the at least one second message to an unmanned vehicle;

receiving a third message including a measured action from the unmanned vehicle;

determining a modified action based upon a desired action included in the first message and the measured action;

including the modified action in the at least one second message; and periodically transmitting a heartbeat message to the unmanned vehicle and transmitting a loss of heartbeat message to the unmanned vehicle control system if a response message to the heartbeat message is not received from the unmanned vehicle.

* * * * *

UNITED STATES PATENT AND TRADEMARK OFFICE
CERTIFICATE OF CORRECTION

PATENT NO. : 8,265,800 B2  
APPLICATION NO. : 11/841447  
DATED : September 11, 2012  
INVENTOR(S) : Smith et al.

Page 1 of 1

It is certified that error appears in the above-identified patent and that said Letters Patent is hereby corrected as shown below:

On the Title Page

In column 2, Item (56) under "Other Publications", line 1, before "STANAG", insert --"--, therefor In column 2, Item (56) under "Other Publications", line 1-2, after "Implications,", insert --"--, therefor In column 2, Item (56) under "Other Publications", line 3, before "A", insert --"--, therefor In column 2, Item (56) under "Other Publications", line 3, after "JAUS,", insert --"--, therefor In column 2, Item (56) under "Other Publications", line 5, before "Notification", insert --"--, therefor In column 2, Item (56) under "Other Publications", line 6, after "PCT/US2008/073621", insert --"--, therefor In column 2, Item (56) under "Other Publications", line 8, delete "J.T." and insert --J. T.--, therefor In the Claims In column 8, line 40, in claim 9, delete "4586messaging" and insert --4586 messaging--, therefor Signed and Sealed this  
Eleventh Day of November, 2014

Michelle K. Lee  
*Deputy Director of the United States Patent and Trademark Office*